(12) United States Patent
Klein et al.

(10) Patent No.: US 8,177,432 B2
(45) Date of Patent: May 15, 2012

(54) LINEAR ROLLER BEARING WITH SEPARATE ROLLING SURFACE PARTS

(75) Inventors: Michael Klein, Grafenrheinfeld (DE);
Richard Kuehnlein, Graefendorf (DE);
Hans-H. Kohlmeier, Hassfurt (DE);
Heinz Rossteuscher, Schwebheim (DE);
Carsten Pfeuffer, Roethlein (DE);
Sascha Frenznick, Hirschaid (DE);
Rudolf Schlereth,
Burkardroth-Frauenroth (DE); Andreas Schupies, Gochsheim (DE); Roland Greubel, Ramsthal (DE)

(73) Assignee: Robert Bosch GmbH, Stuttgart (DE)

( * ) Notice: Subject to any disclaimer, the term of this patent is extended or adjusted under 35 U.S.C. 154(b) by 493 days.

(21) Appl. No.: 12/402,050

(22) Filed: Mar. 11, 2009

(65) Prior Publication Data

US 2009/0263055 A1  Oct. 22, 2009

(30) Foreign Application Priority Data

Apr. 16, 2008  (DE) .......................... 10 2008 019 002

(51) Int. Cl.
*F16C 29/06*  (2006.01)

(52) U.S. Cl. ....................................................... 384/44

(58) Field of Classification Search .................... 384/15, 384/43, 44, 45
See application file for complete search history.

(56) References Cited

U.S. PATENT DOCUMENTS

| 5,005,988 | A | * | 4/1991 | Lyon ................................ 384/44 |
| 5,059,037 | A | * | 10/1991 | Albert .............................. 384/45 |
| 5,161,896 | A | | 11/1992 | Hoefling et al. |
| 5,431,498 | A | * | 7/1995 | Lyon ................................ 384/45 |
| 6,948,851 | B2 | | 9/2005 | Rossteuscher et al. |
| 7,296,929 | B2 | * | 11/2007 | Hantke et al. ................... 384/44 |
| 7,832,932 | B2 | * | 11/2010 | Haub .............................. 384/45 |
| 2002/0144561 | A1 | | 10/2002 | Nagai et al. |

FOREIGN PATENT DOCUMENTS

| DE | 40 41 269 | 3/1992 |
| DE | 20 2004 002 258 | 6/2004 |
| EP | 1 443 229 | 8/2004 |
| EP | 1 808 608 | 7/2007 |
| EP | 1 830 080 | 9/2007 |

* cited by examiner

*Primary Examiner* — Michael P Ferguson
(74) *Attorney, Agent, or Firm* — Michael J. Striker

(57) ABSTRACT

A guide carriage for a linear roller bearing is supportable in a longitudinally displaceable manner via at least one row of rollers on a guide rail which extends in a longitudinal direction, a separate rolling surface part which includes a rolling surface for the rollers is assigned to each row of rollers, and the rolling surface part is connected via an adhesive layer to a carrier body. The adhesive layer is designed essentially planar on the back side of the rolling surface part which faces away from the rolling surface, the rolling surface part being accommodated in a recess—which has an L-shaped cross section—of the carrier body.

5 Claims, 3 Drawing Sheets

LINEAR ROLLER BEARING WITH SEPARATE ROLLING SURFACE PARTS

CROSS-REFERENCE TO RELATED APPLICATION

The invention described and claimed hereinbelow is also described in German Patent Application DE 10 2008 019 002.0 filed on Apr. 16, 2008. This German Patent Application, whose subject matter is incorporated here by reference, provides the basis for a claim of priority of invention under 35 U.S.C. 119(a)-(d).

BACKGROUND OF THE INVENTION

The present invention relates to a guide carriage to a linear roller bearing including a guide carriage of this type, and to a method for its manufacture.

DE 20 2004 002 258 U1 makes known a linear roller bearing, in the case of which a guide carriage is supported in a longitudinally displaceable manner via two rows of rollers on a guide rail which extends in the longitudinal direction. The guide carriage encloses the guide rail in a "U" shape, one row of rollers being situated on each U-shaped leg. The rolling surfaces for the rollers are provided on a separate rolling surface part which is fixedly connected via an adhesive layer to the carrier body of the guide carriage. The rolling surface part includes a projection via which it is pressed into a corresponding recess in the carrier body with an exact fit. Suggested adhesives include Loctite 290 and Loctite 4062, i.e. cyanoacrylate adhesives.

According to DE 20 2004 002 258 U1, the combination of a press-fit connection and a bonded connection results in a particularly thin and even layer of adhesive. The stiffness of the guidance is increased as a result. Use is made, in particular, of the fact that the rolling surface part and the carrier body come to bear directly against one another via the press-fit connection, which increases the stiffness.

A further linear roller bearing is made known in DE 40 41 269 A1. In the embodiment shown in FIG. 11, a total of four endlessly circulating roller rows is provided. The rolling surfaces for the rollers are formed on four separate but essentially identical rolling surface parts. The rolling surface parts are inserted loosely in the carrier body of the guide carriage, their back side being designed in the shape of a circular arc, so that the rolling surface parts may orient themselves toward the rollers. It has been shown that the stiffness of a guide carriage of this type is only minimally less than that of a guide carriage in which the rolling surfaces for the rollers are situated directly on the carrier body. The loss of stiffness is determined primarily by the thickness of the steel inserts. They should be as thin as possible, so that the linear roller bearing has a high guide stiffness. The thickness of the steel inserts is limited at the lower end, however, since it must be ensured that the bearing forces of the rollers which act on the roiling surface parts in a linear manner are distributed across the entire back side of the rolling surface parts as evenly as possible.

The projecting design has the disadvantage that the rolling surface part must be fully machined separately from the carrier body of the guide carriage. The resultant thickness tolerance of the rolling surface part has a negative effect on the precision of guidance of the linear roller bearing. In addition, due to deviations of shape in the mating surfaces between the rolling surface part and the carrier body, it is possible for the rolling surfaces to not be exactly flat. As a result, the transfer of force to the rollers no longer takes place across their entire width, but only via certain points, which greatly reduces the service life of the linear roller bearing.

SUMMARY OF THE INVENTION

Accordingly, it is provided that the adhesive layer is designed essentially planar on the back side of the rolling surface part which faces away from the rolling surface, the rolling surface part being accommodated in a recess—which has an L-shaped cross section—of the carrier body. An "L-shaped recess" refers to a recess which includes two lateral surfaces which are oriented toward each other essentially in an L-shape, so that they may support the rolling surface part in two directions which are perpendicular to one another. As viewed in the cross section, the rolling surface part therefore bears against the carrier body in a statically determinant manner. The flat layer of adhesive implies that the associated first leg of the L-shaped recess and the back side of the rolling surface part are designed as a planar surface, with the result that the rolling surface part may be displaced freely relative to the carrier body during the bonding process. In this context, reference is made explicitly to the fact that the rolling surface part may definitely be located in the L-shaped recess at a distance from the second leg without this affecting the effect of the present invention. While the first L-shaped leg performs a load-transferring function, the second L-shaped leg is used primarily as a surface to capture excessive adhesive. In interaction with the excess adhesive, it also helps to orient the rolling surface part transversely to the longitudinal direction.

Via the proposed embodiment it is attained that relatively thin rolling surface parts may be used, because an essentially plate-like rolling surface part results due to the essentially planar rolling surface and the essentially planar layer of adhesive.

The result is that the linear roller bearing has great stiffness. The adhesive layer is preferably situated parallel to the rolling surface.

At the same time, the rolling surface part may be machined, in particular being ground, in the installed state via the bonding in order to attain a high accuracy of shape of the rolling surfaces. The rolling surface parts are preferably composed of hardened roller bearing steel. A particularly preferred raw material for the rolling surface part is a cold-rolled profiled rod which need only be cut to length and hardened in order to obtain a raw part which is ready to be bonded. It is also feasible, however, to cut the raw parts out of sheet metal.

A decisive factor for the durability of the adhesive connection is that no unnecessary tensions may be introduced into the adhesive layer while the adhesive connection is being formed; this is attained via the isostatic placement in the L-shaped recess. Linear roller bearings which include roller-shaped rolling elements are typically preloaded so that they may operate without play, even when loaded. Several rows of rollers are typically provided for this purpose, the rollers being installed with preload between the guide rail and the guide carriage. To adjust the preload, the roller diameter is selected to be slightly greater than would be necessary in order to install the rollers without play. Via these pretensions, high compressive stresses are introduced into the adhesive layer, and they are further strengthened via the external forces that act on the linear roller bearing during operation. The application of pressure itself does not damage the adhesive layer, however, since it is ruled out that simply the application of pressure may result in a displacement of the rolling surface part relative to the carrier part and, therefore, a rupture of the adhesive layer. The stress state becomes critical when additional stresses, in particular shear stresses, occur which may result in the rolling surface part becoming displaced relative to the carrier body, since this results in a rupture of the adhesive layer.

As a result, the rolling surface part must not be installed in an overrigid manner in the carrier body transversely to the load direction of the rollers, since this results in stresses being applied to the adhesive layer during installation itself. This is attained according to the present invention by placing the rolling surface part in the L-shaped recess.

In contrast, the stresses caused by a press-fit connection as described in DE 20 2004 002 258 U1 have a negative effect on the durability of the bonded connection, in particular when, as in the current case, the only press-fit connection that may be used is one having a minimal load-carrying capacity, since the rolling surface part is very thin. A press-fit connection of this type mainly creates stresses in the adhesive layer and does not play much of a role in transferring loads. A curved adhesive layer, as suggested in DE 40 41 269 A1, should also be avoided, since tensile stresses are induced in the adhesive layer via the compressive force of the rollers. Furthermore, the fact that the rolling surface parts may tilt has a negative effect on the durability of the bonded connection, since this itself may result in a rupture of the adhesive layer if the rolling surfaces are not exactly parallel on the guide rail and the guide carriage, e.g. due to production inaccuracies or a high external load.

The adhesive layer may separate the back of the rolling surface part from the carrier body essentially completely. The adhesive layer may therefore be used to compensate for surface irregularities on the carrier body and the rolling surface part, which is why they must not be machined with excessive accuracy before their final machining which is a grinding step in particular. At the same time, the fact that the adhesive layer extends across the entire surface results in an even transfer of force across the entire back surface of the rolling surface part. Punctiform load peaks which could initiate a crack in the adhesive layer are ruled out.

The rolling surface part may be bonded on the side to a leg of the L-shaped recess. Since the rolling surface part bears via only one of its lateral surfaces against the L-shaped recess in the carrier body via an adhesive layer, strains in the adhesive layer are ruled out from the beginning. The lateral gap between the rolling surface part and the L-shaped recess is used to receive any excess adhesive that was applied to the back of the rolling surface part. This excess adhesive flows into this defined gap which is preferably sized such that the excess adhesive does not fill this gap completely. As a result of the proposed embodiment of the overflow space for the adhesive, only a particularly small amount of material need be removed from the carrier body; removing material reduces stiffness. It should be pointed out that particularly high material stresses occur in the carrier body specifically in this region, which is why the proposed embodiment increases the stiffness in a particularly effective manner. The support effect which is unavoidable due to the lateral bonded connection falls into the background because the aim of the present invention is to prevent loads from acting on the rolling surface part in the transverse direction.

The adhesive may be an epoxide resin. Epoxide resins have the property that they hardly shrink at all when hardened, so that, when hardening occurs, no internal stresses are produced in the adhesive layer, which, in combination with the compressive stresses caused by the rolling element forces, could result in rupture of the adhesive layer. In addition, adhesives based on epoxide resin have a high resistance to fluids which are used with linear roller bearings, such as lubricating oil and cooling-lubricating fluids, thereby ensuring that they will not affect the durability of the bonded connection. The epoxide resin adhesive may be provided with a filler, or not. An adhesive without filler is easier to handle when the bonded connection is created, and it results in a very thin adhesive layer which has a minimal effect on the overall stiffness of the guide carriage. In contrast, an adhesive with filler may transfer a higher compressive force, since a portion of the compressive forces may be transferred directly from the rolling surface part to the carrier body via the filler which has a greater load-carrying capacity. A filler in the form of spherical metal particles is of particular consideration in this case.

The rolling surface part may be designed essentially planar on the front side which includes the rolling surface. In this manner, the rolling surface part is prevented from bearing against the rollers laterally, which would result in transverse forces being introduced into the adhesive layer. The lateral guidance of the rollers may be carried out directly by the carrier body, since this also increases the stiffness of the carrier body. The cause of this is that the related guiding geometry is located in a region of the carrier body in which particular high stresses occur. One or more separate guide parts, in particular plastic parts, which guide the rollers laterally may be provided; a combination of two types of guides is also feasible. Separate guide parts composed of plastic are particularly advantageous when holding projections are provided thereon which may enclose the rollers to prevent them from falling out of the guide carriage when it is not situated on the guide rail. The holding projections may be manufactured particularly cost-effectively using the injection-molding method. In addition, due to the separate guide parts, there is no need to provide undercuts on the carrier body with rolling surface parts bonded in place, thereby making it possible to machine—via grinding, in particular—the guide contours for the rollers together with the rolling surfaces. The flat front side of the rolling element part is preferably parallel to the flat back side of the rolling surface part, thereby enabling the rolling surface part to be manufactured in a particularly simple manner.

A rooflike projection may be provided on the carrier body, on each of the two roof halves of which a rolling surface part for a separate roller row is provided, the two rolling surface parts terminating in a flush manner with the apex of the rooflike projection, or extending past it. Linear roller bearings which include roller-shaped rolling elements typically include several rows of rollers which are loaded relative to one another in order to ensure that the guide carriage and guide rail engage without play, even when loaded. Due to the geometry of the carrier body provided, the rolling surface parts may be bonded to the carrier body particularly easily. It is possible to hold two rolling surface parts in an oriented manner in a V-shaped recess of an installation aid, adhesive being applied to the carrier body and/or the rolling surface parts, and the rolling surface parts being pressed using the installation aid against the rooflike projection of the carrier body. Provided that the rolling surface parts are designed, as preferred, to include two parallel surfaces, the V-shaped recess of the installation aid is designed essentially parallel to the rooflike projection on the carrier body, thereby resulting in an adhesive layer having a constant thickness. The rolling surface parts may be held in the installation aid, e.g. using vacuum suction or magnetic force. To orient the rolling surface parts, an orientation contour which bears against the associated lateral surface of the rolling surface part is provided on the base of the V-shaped recess. For this purpose, it is necessary that the two rolling surface parts terminate in a flush manner with the apex of the rooflike projection or extend past it, so that, when the rolling surface parts are pressed into the carrier body, the installation aid does not strike the apex of the rooflike projection, which would prevent the formation of a thin, even layer of adhesive.

Since the rolling surfaces of the rolling surface parts may be brought into the desired position very exactly due to the V-shaped recess of the installation aid, it is only necessary to provide a minimal machining allowance for the rolling surface parts for the subsequent fine machining, e.g. grinding. The fine machining may be carried out particularly quickly and cost-effectively.

Two opposing pairs of roller rows having the embodiment described above may be provided in order to create a linear roller bearing which includes four rows of rollers. The carrier body is preferably U-shaped in design, so that it may enclose the guide rail. Preferably, a single installation aid is used to install the four rolling surface parts, so that all four rolling surfaces may be oriented relative to each other in an exact manner. One moveable jaw of the installation aid is assigned to each of the two V-shaped projections on the carrier body; the jaws may be moved relative to one another in order to perform the pressing-in motion which is used to bond the rolling surface parts.

A separate deflection assembly for the rollers may be provided on at least one longitudinal end surface of the carrier body, so that the rollers may circulate endlessly, at least one guiding extension which extends in the longitudinal direction being provided on the deflection assembly, the guiding extension bearing in the region of the apex of the rooflike projection against the associated rolling surface parts, so that the deflection assembly is oriented relative to the carrier body. The related lateral surfaces of the rolling surface parts may be manufactured particularly accurately in a cost-effective manner by fine-machining them—in particular via grinding—simultaneously with the associated rolling surfaces. As a result, the deflection assembly may be oriented via the rolling surface parts particularly accurately relative to the carrier body, which is important for the rollers to roll smoothly.

All rolling surface parts of a guide carriage may be designed to be essentially identical, thereby making it possible to manufacture them in a cost-effective manner. This is possible in the case of the embodiment of the carrier body described above.

At least one end-side roller entry region of the rolling surface part may be flexurally resilient in design, and an open space or a fill layer having a substantially greater elasticity than the adhesive layer is provided in the roller entry region between the rolling surface part and the carrier body. The aim of this embodiment is to attain the improved entry of the rollers into the load-transferring region, which was made known in EP 1 443 229 A2. Via the flexurally resilient roller entry region, the rollers are slowly transferred from a load-free state to a fully loaded state. Due to the embodiment described above, it is possible to eliminate the known, separate recess between the rolling surface part and the carrier body. The possible bending path of the rolling surface part is thereby determined by the thickness of the adhesive layer. To ensure that the thickness of the adhesive layer is sufficient, an adhesive which is provided with a filler is preferably used in this embodiment.

It is preferable to use a fill layer in the flexurally elastic region, to eliminate a gap between the rolling surface part and the carrier body, which could become contaminated with grindings if grinding is carried out after bonding. It is very difficult to remove these grindings from the thin gap; if any grindings remain, they would interfere with the bending motion of the rolling surface part.

The rolling surface part may be designed thinner in the roller entry region than it is outside of the roller entry region, thereby making it possible to use an unfilled adhesive. Unfilled adhesives are regularly easier and more cost-effective to use. The attainable adhesive thickness is usually insufficient, however, to attain the bending path required for the entry effect described above. The flattening of the rolling surface part is preferably carried out, cost-effectively, before the rolling surface part is hardened, in a non-material-removing manner, e.g. via pressing. It should be pointed out that there must not be any adhesive in the flexurally resilient entry region in this embodiment, either, since it would interfere with the bending motion of the rolling surface part.

The fill layer may adhere to the rolling surface part in a fixed manner, while it rests loosely on the carrier body. It is therefore possible to apply the fill layer to the separate rolling surface part. This may be carried out, e.g. by using a mask which is placed on the rolling surface part and applying the filler into its open spaces. The fill layer which has been applied to the rolling surface part in this manner may now be easily inspected to determine whether it actually covers the desired region of the rolling surface part. This would not be possible if the fill layer would adhere to the rolling surface part and the carrier par, since it would not be possible to access the fill layer to perform a visual inspection. In this embodiment, the previously-applied fill layer also defines the region of the rolling surface part in which adhesive should not enter, since the fill layer prevents adhesive from flowing into it.

The rolling surface part may extend beyond at least one and preferably both of the longitudinal end surfaces of the carrier body. In this manner, the flexurally resilient roller entry region may be extended without needing to extend the expensive steel carrier body. It is sufficient when there is enough open space for the overhanging rolling surface part in the cost-effective deflection assembly which is composed of plastic. In this context it should be pointed out that the necessary length of the flexurally resilient roller entry region is determined by the fact that it must be ensured that the rollers—in every operating state of the linear roller bearing—must come in contact with the rolling surface of the rolling surface part in an essentially load-free manner when they enter the carrier region.

The thickness of the rolling surface part may be between 35% and 50%, and preferably 40% and 45% of the roller diameter. This thickness of the rolling surface part is the minimal thickness at which it is ensured that the compressive forces of the rollers, which is introduced into the rolling surface part in a linear manner, is transferred essentially evenly to the back side of the rolling surface part. It should be noted that certain irregularities in the load distribution on the back side of the rolling surface part are unavoidable. It should be ensured, however, that the load peaks do not result in a plastic deformation of the carrier body, the adhesive layer, or the rolling surface part, since this would reduce the preload of the guide carriage.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
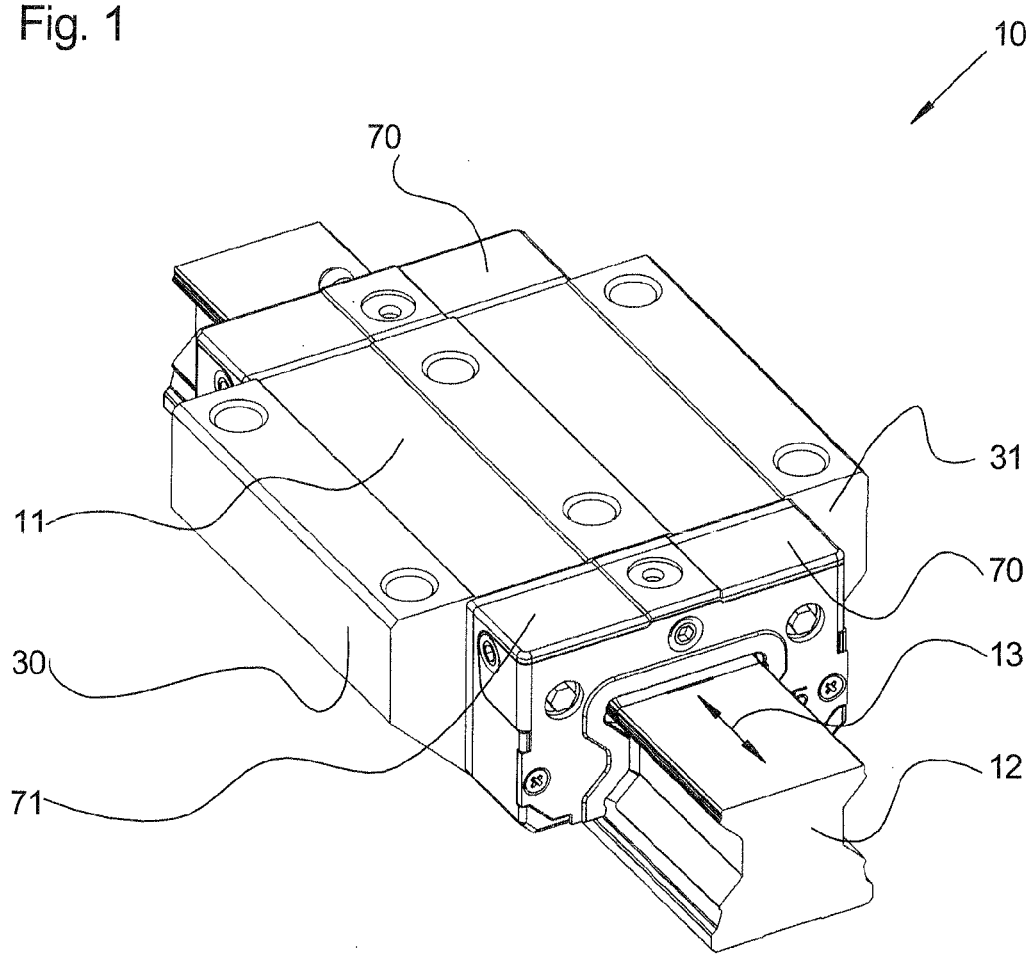
FIG. 1 shows a perspective view of linear roller bearing according to the present invention.

A linear roller bearing according to the present invention is labelled in general with reference numeral 10 in FIG. 1. This linear roller bearing is designed essentially as described in DE 10 2007 056 862, which is hereby referenced and incorporated as subject matter of the present application. Linear roller bearing 10 includes a guide rail 12 which is composed of hardened steel and extends in a longitudinal direction 13, and on which a guide carriage 11 is supported in a longitudinally displaceable manner. Guide carriage 11 is composed of a carrier body 30 which is made of non-hardened steel, on both longitudinal end surfaces 31 of which a deflection assembly 70 is provided for the rollers which circulate endlessly in guide carriage 11.

Figure 2:
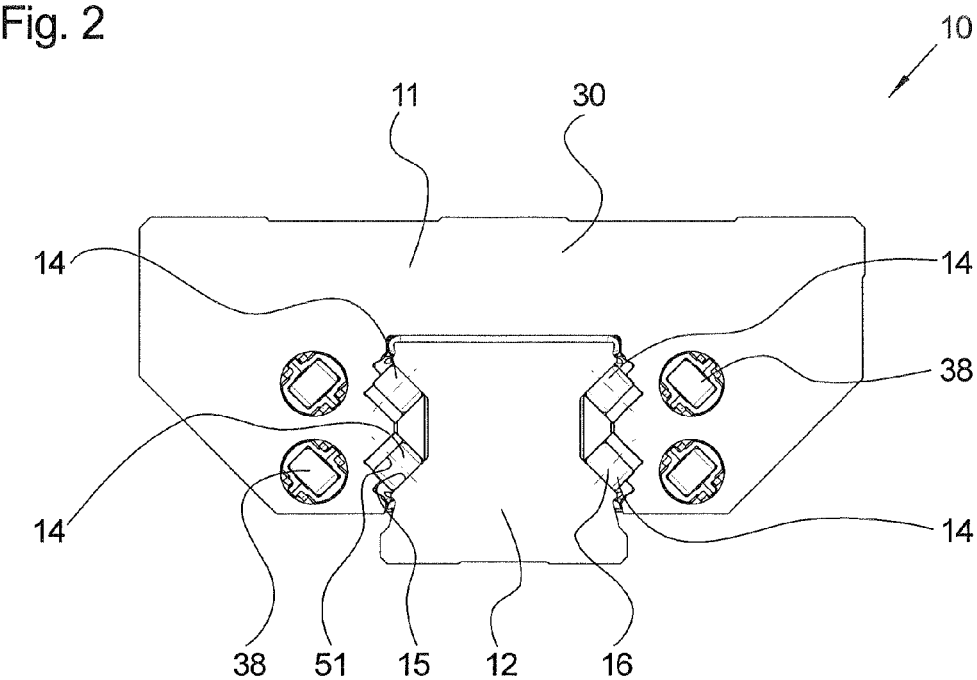
FIG. 2 shows a cross section of the linear roller bearing in FIG. 1.

FIG. 2 shows a cross section of linear roller bearing 10. In the present embodiment, guide carriage 11 encloses guide rail 12 in a U-shaped manner; the combination of a U-shaped guide rail and a block-type guide carriage is also feasible. Four load-carrying rows of rollers 14 are located between carrier body 30 and guide rail 12, pressure lines 16 of which are oriented in an "O" shape, in a known manner, to ensure that the load-carrying capacity of linear roller bearing 10 is even in all directions. Rolling surfaces 15; 51 on which rollers 14 may roll in a load-carrying manner are provided on guide rail 12 and guide carriage 11. Every load-carrying row of rollers is connected via the deflection assemblies mentioned above to an associated return channel 38, thereby ensuring that the rollers may circulate endlessly. In present guide carriage 11, the curved deflection channels intersect in the deflection assemblies. Reference is therefore also made to "crossover deflection".

Figure 2A:
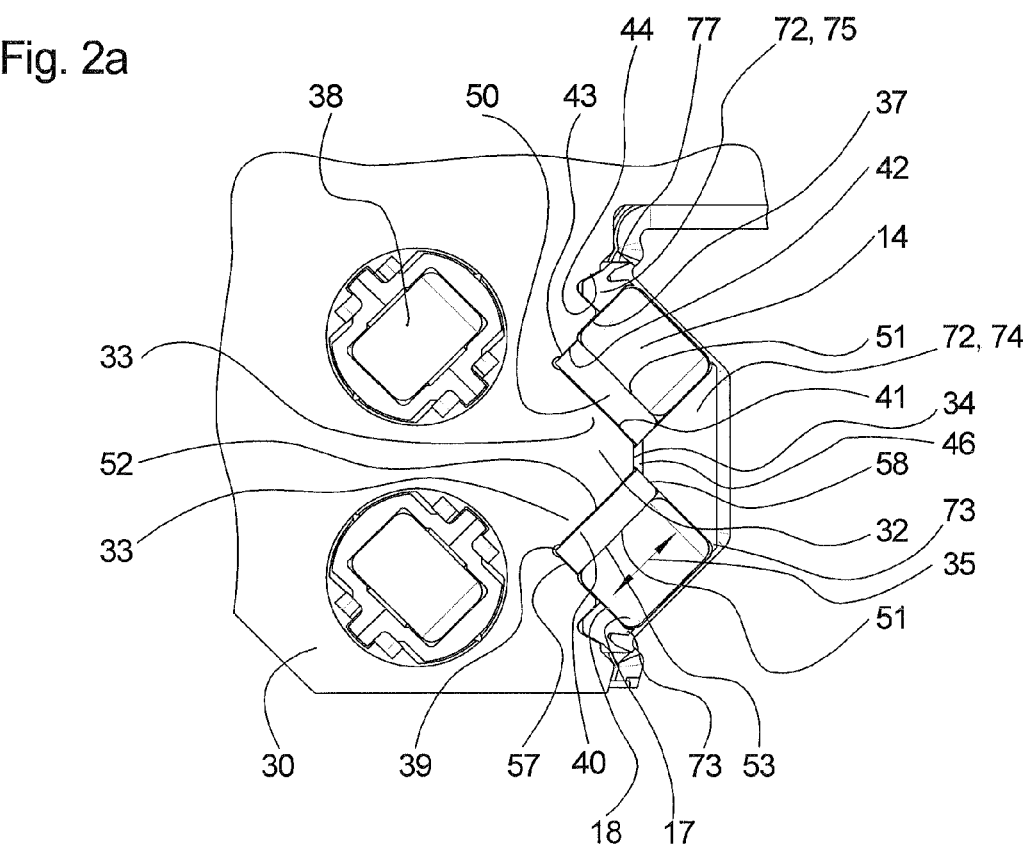
FIG. 2a shows an enlarged partial view of FIG. 2 in the region of the rolling surface parts.

FIG. 2a shows an enlarged section of FIG. 2 in which rolling surface parts 50 with rolling surfaces 51 for rollers 14 are shown more clearly. Rolling surface parts 50 which are composed of hardened steel have an essentially rectangular cross-sectional shape which includes a front side 53 on which rolling surface 51 is provided, an opposing back side 52, and two lateral surfaces 57; 58, the cross-sectional shape remaining essentially constant across the entire length of the rolling surface part. Rolling surface parts 50 are cut out of a non-hardened sheet-metal material, or they are trimmed from a non-hardened, cold-rolled profiled rod and then hardened. After they are bonded with L-shaped recess 40 in carrier body 30, rolling surfaces 51 on rolling surface parts 50 are ground together with the contours—which abut rolling surface parts 50—of carrier body 30. Rolling surface parts 50 are bonded on back side 52 and first lateral surface 57 to carrier body 30.

The adhesive, in the form of an epoxide resin, is applied only to back side 52 of rolling surface part 50 and/or first L-shaped leg 41, a large number of separate points of adhesive being applied to the surfaces mentioned, so that as much air as possible may escape from the bonding gap when rolling surface part 50 is pressed onto carrier body 30. Lateral adhesive gap 43 becomes filled with excess adhesive when rolling surface part 50 is pressed onto carrier body 30. The quantity of adhesive and the widths of the adhesive gaps are designed to ensure that lateral adhesive gap 43 is not filled entirely with adhesive, thereby ensuring that no adhesive enters the region of the surfaces which will be subsequently ground. This could have a negative effect on the grinding process. An undercut 39 in carrier body 30 is provided in the corner between first and second legs 41; 42 of L-shaped recess 40 in order to ensure that rolling surface part 50 does not bear against carrier body 30 in a punctiform manner at this point, as this would prevent an even transfer of load via the adhesive layer.

In every case, two L-shaped recesses 40 form a rooflike projection 32 on carrier body 30, the first two L-shaped legs 41 forming the two roof halves 33. Apex 34 of rooflike projection 32, i.e. the contour, at which the two roof halves 33 meet, is set back slightly relative to rolling surface parts 50. Apex 34 is therefore not machined at the same time when the two lateral surfaces 58 of adjacent rolling surface parts 50 are simultaneously ground; there is therefore no risk that the grinding disc will break out in this region.

Front side 53 of rolling surface part 50 which includes rolling surface 51 is designed completely planar, so that rollers 14 are not supported on rolling surface part 50 in transverse direction 35. Instead, rollers 14 are guided laterally via separate guide parts 72. A guide extension 74 which extends in the longitudinal direction and is designed as a single piece with the end cap (see FIG. 3) is provided. Guide extension 74 bears against second lateral surfaces 58—which have been machined exactly—of two adjacent rolling surface parts 50 with slight preload, while a gap 46 is provided which faces carrier body 30. The two mating surfaces 76 (see FIG. 3) of guide extension 74 are designed completely planar, so that second lateral surfaces 58 of rolling surface parts 50 define the position of the lateral guide surfaces for rollers 14.

On the side of rollers 14 opposite guide extension 74, the lateral guidance of rollers 14 is performed by a separate sealing frame 75 (see FIG. 3) which bears directly against carrier body 30. Holding projections 73 which enclose rollers 14 in the region of their corner radius 17 to prevent them from falling out of guide carriage 11 when it is not situated on the guide rail are provided on sealing frame 75 and guide extension 74. To increase the holding effect, sealing frame 75 bears against a surface 44 which is situated at a slight slant relative to end surface 18 of rollers 14. When rollers 14 lift off of associated rolling surfaces 51, they carry sealing frame 75 via holding projections 73 along with them. Since surface 44 is slanted, sealing frame 75 moves toward roller 14, thereby eliminating the lateral guidance play between rollers 14 and guide parts 72 and clamping rollers 14 between guide parts 74; 75. The hold on the rollers is improved significantly as a result of this clamping effect. A sealing lip 77 which bears against the guide rail in order to seal the linear roller bearing in the longitudinal direction is provided on sealing frame 75, adjacent to the holding projections.

In the present embodiment, a support surface 37 for rollers 14 is also provided on carrier body 30. Supporting surface 37 is provided mainly to ensure that the load-carrying material width is sufficient in the direction toward return channel 38. The stiffness of the linear roller bearing may be markedly improved as a result. It should be pointed out that sealing frame 75 and support surfaces 37 are matched to one another such that flat end surfaces 18 of the rollers normally bear only against sealing frame 75, while a small gap is present in the direction toward support surfaces 37. The small gap is eliminated due to the elasticity of sealing frame 75 when rollers 14 are pressed against support surface 37 by the rolling forces.

The purpose of this is to prevent an unnecessary development of noise caused by the metallic friction between rollers 14 and carrier body 30.

Figure 3:
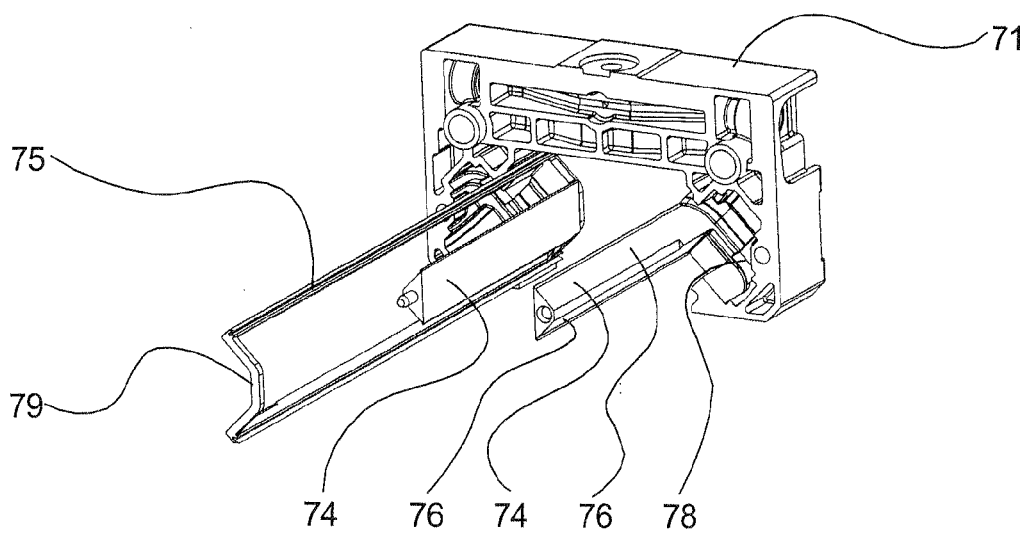
FIG. 3 shows a perspective view of the end cap of the linear roller bearing in FIG. 1 from the side facing the carrier body.

FIG. 3 shows an end cap 71 with sealing frame 75 installed, sealing frame 75 being designed as a separate component. End cap 71 forms the central component of the deflection assembly in which curved deflection channels 78 are provided. The exact design of deflection assembly 70 is found in DE 10 2007 056 862 which is expressly referred to once more here. The two guide extensions 74 are provided as single pieces with end cap 71 which is injection-molded out of plastic; they extend in the longitudinal direction along half the length of the carrier body, so that guide extensions 74 of both end caps 71 together guide the rollers without interruption across the entire length of the carrier body. Sealing frame 75 is snapped in place with the two end caps via a holding segment 79 which is located on the end. In FIG. 3, the sealing frame on the right and the end cap located in the front were left out, to enhance clarity.

Figure 4:
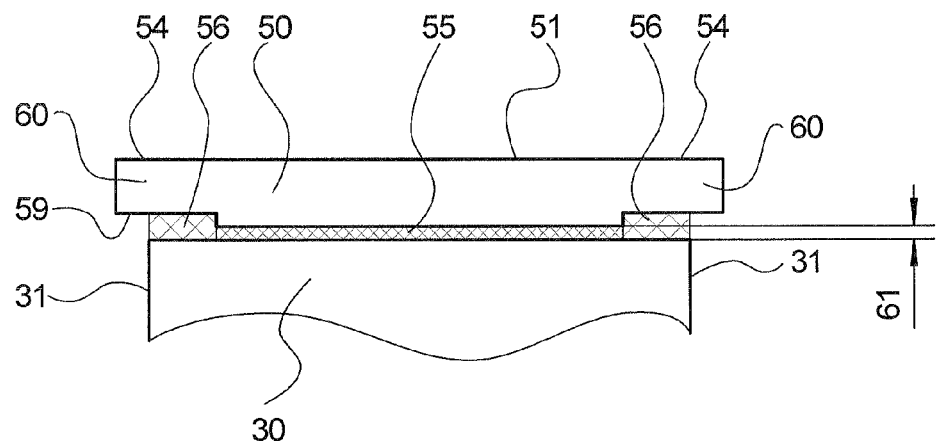
FIG. 4 shows a basic schematic longitudinal view of a bonded rolling surface part.

FIG. 4 shows a basic schematic longitudinal view of rolling surface part 50 which is bonded with carrier body 30. Rolling surface part 50 is flexurally resilient in design on both longitudinal end surfaces 31 of carrier body 30, i.e. in roller entry region 54. A fill layer 56 which has substantially less stiffness than adhesive layer 55 is provided under rolling surface part 50. Fill layer 56 is composed, e.g. of a rubber material such as polyurethane. In addition, rolling surface part 50 includes two sections 59 which extend into the deflection assembly and which extend past longitudinal end surface 31 of carrier body 30. Rolling surface part 50 is therefore supported in roller entry region 54 via very little stiffness. As a result, this section of thin rolling surface part 50 is curved downward via the incoming rollers. According to EP 1 443 229 A2, the length of flexurally resilient region 60 is designed larger in size than the roller diameter; this region is therefore always bent by at least one roller. To provide a sufficient amount of free space for the bending path, rolling surface part 50 is designed thinner in flexurally resilient region 60 than in the remaining region. This flattening of rolling surface part 50 may be created, e.g. by plastically deforming rolling surface part 50 in one working step when rolling surface part 50 is cut off a profiled rod.

Adhesive layer 55 is an epoxide resin layer having a thickness 61 of approximately 20 μm to 80 μm. Due to the minimal layer thickness, adhesive layer 55 has very little elastic resilience. As a result, the stiffness of the linear roller bearing is hardly affected at all by the bonding. To attain a minimal adhesive layer thickness 61 of this type, an adhesive must be used that does not include a filler. It should be pointed out that fill layer 56 is applied to individual rolling surface part 50 before the bonding procedure, to ensure that fill layer 56 bonds only to individual rolling surface part 50. In the actual bonding procedure, the fill layer prevents excess adhesive from entering the region that includes fill layer 56. Instead, the adhesive will flow into the lateral adhesive gap described above. It is also feasible to provide a fill layer (not depicted) on the lateral edges of rolling surface part 50, so that rolling surface part 50 is not bonded to carrier body 30 across the entire width. In this manner, it is possible to prevent excessive edge stresses on the rolling surfaces when rolling surface 51 is exactly planar in design and does not, as usual, have a surface profile that is curved in a slightly logarithmic manner.

Figure 5:
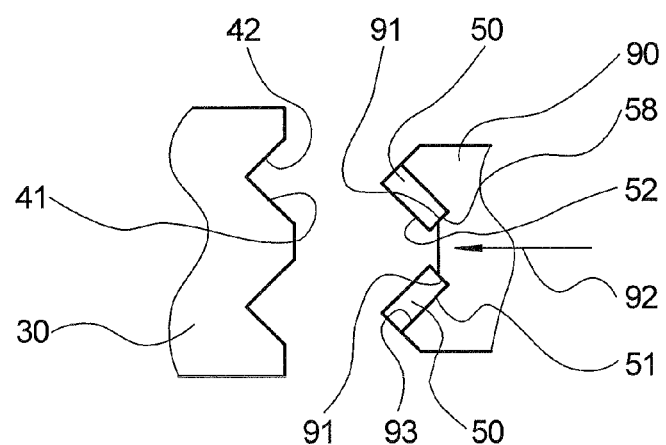
FIG. 5 shows a basic schematic illustration of the bonding process.

FIG. 5 shows the procedure of bonding rolling surface part 50 to carrier body 30 using installation aid 90. Rolling surface parts 50 are placed in a V-shaped recess 93 of installation aid 90, so that rolling surfaces 51 are oriented exactly before the grinding is carried out at a later point in time. Rolling surface parts 50 are oriented exactly parallel to the longitudinal direction via orientation contour 91 which bears against second lateral surface 58 of rolling surface parts 50. They are held in this position via vacuum suction or magnetic force. The adhesive is then applied at various points on back side 52 of rolling surface parts 50 and on the two first L-shaped legs 41 of carrier body 30. Rolling surface parts 50 are then pressed against carrier body 30 in pressing direction 92 using installation aid 90. V-shaped recess 93 of installation aid 90, the position of the two second L-shaped legs 42 on carrier body 30 and the cross-sectional dimensions of rolling surface parts 50 are matched to one another in a manner such that the rolling surface parts are pressed into carrier body 30 with minimal clearance from second L-shaped legs 42. It is therefore ensured that rolling surface parts 50 are not displaced relative to installation aid 90 by second L-shaped legs 42. At the same time a lateral adhesive gap is created which may receive the excessive adhesive in the manner described.

It will be understood that each of the elements described above, or two or more together, may also find a useful application in other types of constructions differing from the types described above.

While the invention has been illustrated and described as embodied in a linear roller bearing with separate rolling surface parts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A guide carriage for a linear roller bearing, comprising:
   a guide rail extending in a longitudinal direction;
   at least one row of rollers on said guide rail, said at least one row of rollers configured to support the linear roller bearing in a longitudinally displaceable manner;
   a separate rolling surface part which includes a rolling surface for the rollers being assigned to each row of rollers, wherein said rollers include circular-arc-shaped peripheral surfaces for contacting an associated rolling surface part so that said rollers roll over said associated rolling surface part, and which is connected via an adhesive layer to a carrier body, so that each layer is configured substantially planar to a back side of the rolling surface part which faces away from the rolling surface; and
   a recess provided in the carrier body, wherein the rolling surface part is accommodated in the recess, and wherein said recess has an L-shaped cross section,
   wherein the rolling surface part has at least one end-side roller entry region which is flexurally resilient, and an element selected from the group consisting of an open space and a fill layer having a substantially greater elasticity than the adhesive layer is provided in the roller entry region between the rolling surface part and the carrier body.

2. The guide carriage as defined in claim 1, wherein when said element is the fill layer, the fill layer adheres in a fixed manner to the rolling surface part, but it rests loosely on the carrier body.

3. The guide carriage as defined in claim 1, wherein the rolling surface part extends past at least one longitudinal end surface of the carrier body.

4. The guide carriage as defined in claim 1 wherein the rolling surface part extends past both longitudinal end surfaces of the carrier body.

5. A guide carriage for a linear roller bearing, comprising:
   a guide rail extending in a longitudinal direction;
   at least one row of rollers on said guide rail, said at least one row of rollers configured to support the linear roller bearing in a longitudinally displaceable manner;
   a separate rolling surface part which includes a rolling surface for the rollers being assigned to each row of rollers, wherein said rollers include circular-arc-shaped peripheral surfaces for contacting an associated rolling surface part so that said rollers roll over said associated rolling surface part, and which is connected via an adhesive layer to a carrier body, so that each layer is configured substantially planar to a back side of the rolling surface part which faces away from the rolling surface; and
   a recess provided in the carrier body, wherein the rolling surface part is accommodated in the recess, and wherein said recess has an L-shaped cross section, wherein the rolling surface part has at least one end-side roller entry region which is flexurally resilient, and an element selected from the group consisting of an open space and a fill layer having a substantially greater elasticity than the adhesive layer is provided in the roller entry region between the rolling surface part and the carrier body, and wherein the carrier body has a roof-shaped projection having two roof halves, wherein a separate and distinct rolling surface part for a separate and distinct roller is provided on each of said two roof halves, wherein the two rolling surface parts are arranged in a manner selected from the group consisting of terminating flush with an apex of the roof-shaped projection and extending past it.

* * * * *